H. CLAUDE & O. LACOMBE.
AUTOMOBILE INDICATOR.
APPLICATION FILED JUNE 22, 1916.

1,240,176.

Patented Sept. 18, 1917.

WITNESSES

INVENTORS
H. CLAUDE
O. LACOMBE
BY Featherstonhaugh & Co.
ATTYS.

UNITED STATES PATENT OFFICE.

HORACE CLAUDE, OF CLARKSTOWN, OTTAWA, AND OVILA LACOMBE, OF OTTAWA, ONTARIO, CANADA.

AUTOMOBILE-INDICATOR.

1,240,176.

Specification of Letters Patent.  Patented Sept. 18, 1917.

Application filed June 22, 1916. Serial No. 105,310.

*To all whom it may concern:*

Be it known that we, HORACE CLAUDE, of 51 Catherine street, Clarkstown, Ottawa, and OVILA LACOMBE, of 309 St. Patrick street, in the city of Ottawa, Province of Ontario, Dominion of Canada, have invented certain new and useful Improvements in Automobile-Indicators, of which the following is the specification.

This invention relates to improvements in automobile indicators of that type disclosed in my copending application Serial No. 76,490, for automobile indicators, filed February 4, 1916, from which this case has been divided with the exception of the V-shaped arrangement and the wave like recess shown in Fig. 2, and the objects of the invention are to notify the traffic officer and the general public the direction in which the automobile is being driven, to render the indicator capable of being effectively utilized at night, to simplify the construction of the indicator and to adapt the several parts to better perform the functions required of them. With the above objects in view the invention consists essentially of the improved construction particularly described and set forth in the following specification and accompanying drawings forming part of the same.

In the drawings.

Like characters of reference refer to like parts in the several figures.

Figure 1:
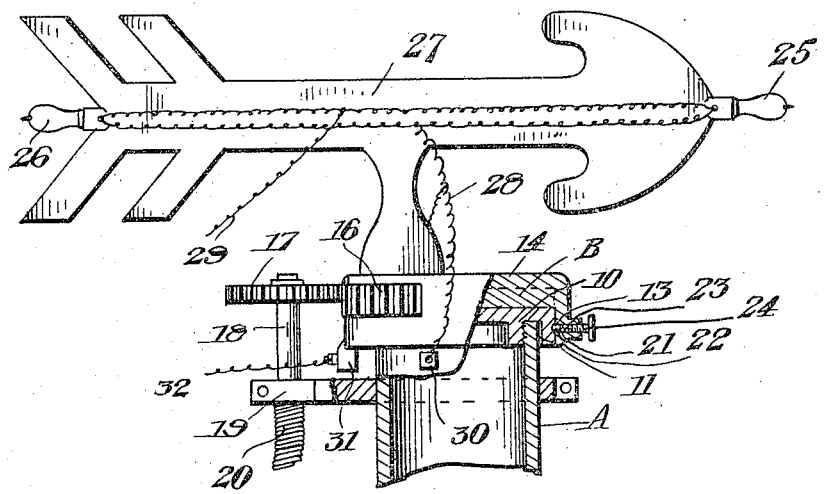
Figure 1 is a side elevation partly sectional of the improved indicator.
Figure 2:
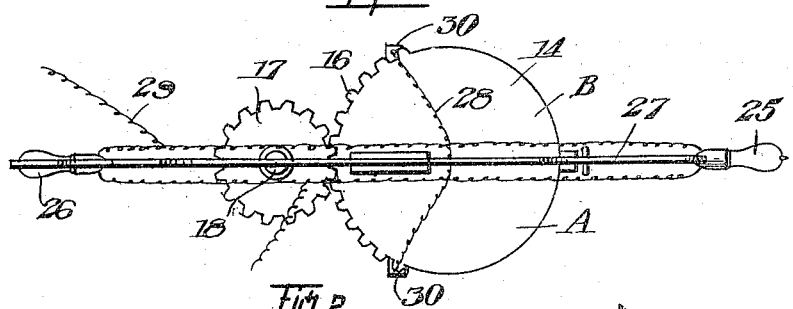
Fig. 2 is a plan view of the same.
Figure 4:
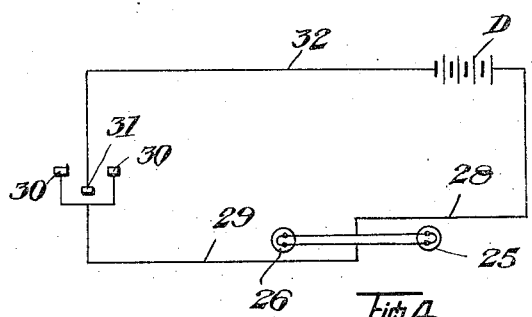
Fig. 4 is a diagrammatic view of the wiring.
Figure 3:
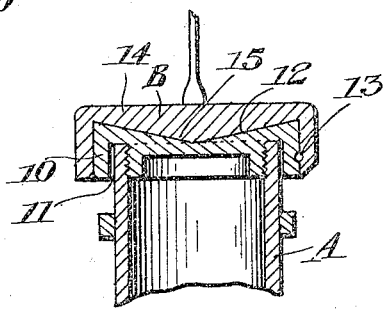
Fig. 3 is a transverse section of the improved indicator.

Referring to the drawings, A represents the inlet conduit of an automobile radiator and B the improved indicator mounted thereon. The cap 10 of the radiator is preferably formed with an annular recess 11, and makes threaded engagement with the inlet conduit A of the radiator and is further provided on the top with a V-shaped recess 12 extending diametrically thereacross. The periphery of the cap 10 is provided with an annular recess 13 extending therearound in a wave like manner the object of which will be made clear hereafter.

Rotatably mounted on the cap 10 is a cover 14 formed on its inner face with a V-shaped projection 15 adapted to normally engage with the recess 12 in the cap 10, while the periphery of the cover is provided with a curvilinear rack 16 which extends partially therearound. This rack meshes with a pinion 17 rigidly mounted on the upper end of the stub spindle 18 rotatably supported by the clamp 19 which frictionally engages the conduit A of the radiator, the lower end of the stub spindle being operatively connected to the flexible shaft 20 which extends to a point adjacent to the driver's seat and is capable of being manually rotated.

To prevent displacement of the cover 14 an orifice 21 extends therethrough in which the ball 22 is located and designed to engage with the annular recess 13 in the cap 10, the ball being held in place by the spiral spring 23 which coacts with the screw 24 making threaded engagement with the said orifice.

To permit of the indicator being utilized at night we provide lights 25 and 26 at the front and rear ends of the pointer 27 operatively mounted on the cover 14, the said lights being operatively connected by the wire 28 to a source of power D and by wire 29 to the contacts 30 mounted on the inlet conduit A but insulated therefrom.

The cover 14 is provided with an insulated contact 31 which is connected with a source of power D by the wire 32.

The assembly of the indicator will be readily understood from the foregoing description.

When an automobile fitted with this indicator is in use and the corner is about to be negotiated the driver rotates the flexible shaft 20 thereby transmitting rotary motion to the pinion 17 which in turn rotates the cover 14. Because of the wave like formation of the recess 13, the cover rides upwardly and frees the projection 15 from the recess 12. The cover is thereby displaced so that the pointer 27 will indicate the direction in which the automobile is being driven and thus notify the traffic officer.

After the automobile has taken the desired turn and is again running in a straight direction the driver may rotate the flexible shaft 20 to return the pointer 27 to its normal position but should the driver forget this operation it will be automatically performed owing to the tendency of the V-shaped projection 15 slipping on the coacting V-shaped recess 12 in the cap 10.

When this indicator is being utilized at night and the cover 14 has been rotated to the desired extent the contact 31 engages with one of the contacts 30 and closes an electric circuit including the source of power D the wire 32, contact 31, contact 30, wire 29, lamps 25 and 26 and wire 28 back to the source of power D, thereby passing electrical energy through the said circuit and resulting in the lighting of said lamp.

These lamps will be of different colors so that the location of one relatively to the other will be clearly seen, and the traffic officer will have no doubt in understanding in which direction the automobile is traveling.

After the automobile has taken a corner and is running in a straight course with the pointer 27 in its normal position the engagement between the contacts 30 and 31 will be broken and the lamps will be extinguished.

From this description it will be seen that we have invented an indicator capable of being advantageously employed on an automobile and whereby the traffic officers and the general public are notified of the direction of travel of the automobile.

As many changes could be made in the above construction and many apparently widely different embodiments of my invention, within the scope of the claims constructed without departing from the spirit or scope thereof, it is intended that all matters contained in the accompanying specification and drawings shall be interpreted as illustrative and not in a limiting sense.

What we claim as our invention is:

1. The combination with an automobile, of a cap mounted on the automobile radiator provided with a V-shaped recess in the upper face thereon and a peripheral recess, a cover rotatably mounted on the cap provided with a V-shaped projection coacting with the V-shaped recess, a ball coacting with the peripheral recess, resilient means for pressing the ball inwardly, a pointer mounted on the cover, lamps on the front and rear ends of the pointer, and means for closing an electric circuit including said lamps when the pointer has been deflected.

2. The combination with an automobile, of a cap mounted on the automobile radiator, a cover rotatably engaging the cap, a pointer operatively mounted on the cover, an electric contact mounted on the cover and insulated therefrom, a pair of contacts located on opposite sides of the first said contact and designed to engage therewith, lamps on the front and rear ends of the pointer operatively connected to the second said contacts, means for rotating the cover, and automatic means for returning the cover to initial position.

3. The combination of an automobile of a cap mounted on the automobile radiator, a cover rotatably engaging the cap, a curvilinear rack extending partially around the cover, a pinion meshing with the rack, a pointer carried by the cover, lamps on the front and rear ends of the pointer, means for closing an electric circuit including said lamp when the pointer has been deflected, a flexible shaft operatively connected to the pinion to rotate the cover, and automatic coacting angular means for returning the cover to initial position.

In witness whereof we have hereunto set our hands.

HORACE CLAUDE.
OVILA LACOMBE.

Copies of this patent may be obtained for five cents each, by addressing the "Commissioner of Patents, Washington, D. C."